April 23, 1963 L. C. RUBENS 3,086,247
COMPOSITION COMPRISING EXPANDABLE THERMOPLASTIC MATERIAL
AND POWDERED IRON AND METHOD FOR MOLDING SAME
Filed Feb. 13, 1956
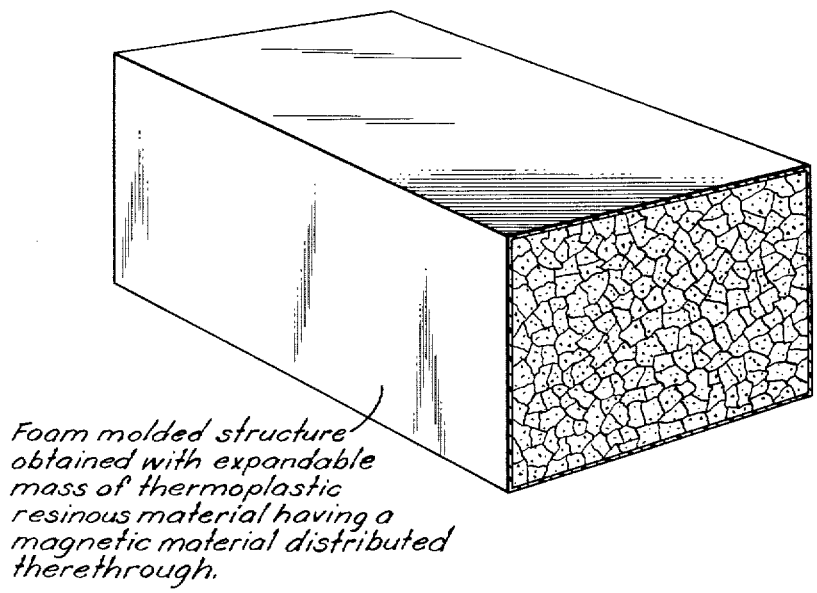
Foam molded structure obtained with expandable mass of thermoplastic resinous material having a magnetic material distributed therethrough.
INVENTOR.
Louis C. Rubens
BY
Griswold & Burdick
ATTORNEYS United States Patent Office 3,086,247
Patented Apr. 23, 1963

3,086,247
COMPOSITION COMPRISING EXPANDABLE THERMOPLASTIC MATERIAL AND POWDERED IRON AND METHOD FOR MOLDING SAME
Louis C. Rubens, Midland, Mich., assignor to The Dow Chemical Company, Midland, Mich., a corporation of Delaware
Filed Feb. 13, 1956, Ser. No. 564,974
7 Claims. (Cl. 18—48)

This invention relates to an improved molding composition comprising expandable thermoplastic resinous materials and to an improved method for molding such materials. It also has reference to the molded articles which advantageously may be obtained by the practice of such a method and by the utilization of such compositions.

Pursuant to the known art, a variety of thermoplastic polymeric and resinous materials may be expanded from a granular or bead form to assume a porous, cellular, solidified foam-like structure by the action of various propellents or agents for expanding or blowing the materials. The blowing agents, in accordance with common practice, are usually gases (or gas generating substances) or highly fugacious liquids which have been dissolved or otherwise intimately incorporated within the thermoplastic resinous material while it is in an unexpanded granular or bead form. The application of heat to an unfoamed or incompletely foamed granular thermoplastic resinous material containing a blowing agent causes the blowing agent to be released or thermally expanded, or both, while the thermoplastic material is attaining a foaming temperature at which it is sufficiently softened and yieldable to permit the pressure of the thermally expanding blowing agent to form it into the desired foam structure. The heat energy which is required to soften the resinous material and expand the blowing agent for the foam forming function may conveniently be derived from an externally generated source. Thus steam, hot air, heated bath, radiant heat and other heat-supplying means may be employed for the purpose of foaming the expandable thermoplastic resinous material.

Many expandable thermoplastic resinous materials have the potential for being expanded to a foamed volume which may occupy as much as 30 to 40 times and more their original volume in an unfoamed and completely unexpanded condition. If a granular mass of a given quantity of expandable thermoplastic resinous material is foamed or expanded within a confining space, such as a mold form, having a capacity which is less than the volume which may be anticipated from the expansion potential of the mass being foamed, the expanding mass is caused to be distorted to and to assume the configuration of the confining space and to be fused into an integral, molded foam structure.

Difficulty, however, is frequently encountered in properly distributing the expanding mass of thermoplastic resinous material within a confining space so as to obtain molded foam structures which are shaped to the precise outlines of the mold and which have uniform cross-sectional characteristics and densities. The situation becomes even more aggravated when confining spaces having relatively more complex and irregular configurations are employed in the manufacture of molded foam structures and articles.

Even the utilization of pre-expanded granules of thermoplastic resinous materials does not preclude or eliminate all difficulty in obtaining suitably molded foam structures. Such granules are those which have been incompletely foamed or expanded prior to their final formation to a completed foam structure in a molding or other operation. Frequently, pre-expanded granules may be partially foamed to as much as 60–70 percent and more of their expansion potential before being molded. In such a condition, they tend to provide a better and more uniform distribution of material in molded foam structures by occupying greater relative proportions of a mold confining space in comparison to that which is occupied by expandable materials which are completely unfoamed or in less expanded condition. Such pre-expanded granules, however, have considerable thermal insulating characteristics and are not readily heatable after having been partially expanded in order to obtain properly expanded and formed ultimate structures. In many instances, for example, heat supplying means must be internally provided within a mass of pre-expanded granules in order to complete their expansion in a suitable manner, as when steam probes and the like are utilized in foam molding apparatus. In addition, the employment of pre-expanded masses of thermoplastic resinous materials involves a wasteful and inefficient use of heat energy due to the duplex heating procedure which is necessary in order to finally attain a foam molded structure. Furthermore, pre-expanded masses frequently are awkward and difficult to handle since they are low density materials of a voluminous nature and are sometimes inclined to assume charges of static electricity during their handling.

It would be advantageous for compositions comprised of expandable thermoplastic resinous materials to be available which, expediently and with the utilization of readily-procurable apparatus, could be molded into foam structures having precise definition and outline and uniform cross-sectional characteristics and densities even in relatively complex molded configurations. It would also be advantageous for a method to be available for forming expandable thermoplastic resinous materials in molds so that well formed products having uniform phyiscal characteristics could generally be easily obtained. It would be additionally advantageous if foam molded articles having the mentioned characteristics could be provided readily. In this way much of the difficulty encountered in suitably molding expandable thermoplastic resinous materials, even when they are in a pre-expanded condition, would be eliminated. The attainment of these ends and the realization of other desiderata is among the principal objects of the present invention.

Compositions in accordance with the present invention are comprised of a thermoplastic resinous material in discrete, granular form in which there is incorporated a blowing agent and with which there is distributed in approximate uniformity a quantity of a magnetic material. Such a composition may advantageously be formed into a foam structure having precise definition and uniform, controlled cross-sectional characteristics and density according to the method of the invention by placing it within the confining space of a mold form, attracting the magnetic material-containing mass of expandable thermoplastic resinous material by means of at least one magnetic field which is positioned and directed in a manner tending to physically position and distribute the mass uniformly within the confining space of the mold form, and subjecting the magnetically attracted expandable mass while it is under the influence of the magnetic field to an adequate quantity of heat to soften the thermoplastic resinous material and cause expansion of the blowing agent in the discrete particles in the mass to expand the mass to an integral, substantially uniform, molded foam structure.

Articles molded in accordance with the invention are comprised of foam structures of expanded, magnetic material-containing thermoplastic resinous material which have a controlled and substantially uniform density and other cross-sectional characteristics and which may be obtained in any desired shape having close conformance to the pattern and configuration of the mold form in which they were prepared. Such an article is illustrated perspectively and in cross section in the accompanying drawing.

Magnetic materials such as iron, cobalt, nickel and their magnetic alloys and compounds such as magnetic ferric oxide ($Fe_3O_4$), or mixtures thereof may advantageously be employed in the practice of the present invention as the magnetic material which is distributed in the unexpanded, granular mass of thermoplastic resinous material. Preferably, the magnetic material is distributed in a finely divided solid form. It may be incorporated within the discrete expandable particles of the mass of thermoplastic resinous material during its formation or preparation. Or, alternatively, it may be distributed by surface attachment on the individual particles. The distribution need not be with a precise or quantitative uniformity throughout the mass but may be in approximate uniformity, as when the particles are randomly attached on the granular surfaces. The attachment may be the result of mere physical forces in an intimately mixed incorporation or it may be effected with the assistance of various adhesive or bonding materials, mixtures or solutions which have no adverse foam forming effect on the thermoplastic resinous material.

By way of example, many solutions of resinous materials, such as lacquers, may be employed advantageously for efficiently attaching the particles of magnetic material to the surfaces of the expandable granules. This may be simply accomplished by thoroughly mixing with the expandable mass of thermoplastic resinous material a dispersion of the magnetic material in such a solution. As is apparent, a more firm attachment of the magnetic material to the expandable granules provides for a greater positioning and distributing efficiency of the granules under the influence of the magnetic field.

The quantity of magnetic material which may be employed depends on a variety of circumstances, factors and conditions such as the quantity of the mass being expanded in a given mold forming operation, the efficacy of incorporation and distribution of the magnetic material in the expandable mass, the particle size of the granules and their free-flowing characteristics, the configuration of the mold form being utilized, the strength of the magnetic field which is employed, and the degree of benefit desired to be obtained in use of the magnetic material. Ordinarily it is desirable to use enough of the magnetic material to insure efficient positioning and distribution of the unexpanded mass within the mold form under the influence of the available magnetic field or fields being employed so that the unexpanded mass may be magnetically induced to be uniformly distributed over desired portions of the mold surface. Frequently, it is beneficial to employ at least about one percent by weight of such a magnetic material as finely powdered iron in the unexpanded mass although greater or lesser amounts of powdered iron or its magnetic equivalent may be more suitable in certain instances.

The magnetic field (or fields) which is (or are) employed may be provided by permanent or electromagnets or combinations thereof. They may be built into and constitute an integral part of the mold form apparatus so that any desired portion or all of the mold is rendered magnetic or they may be positioned and utilized external thereto. It is usually advantageous to dispose and direct the magnetic fields in a manner which will insure a substantially uniform distribution of the unexpanded mass of expandable thermoplastic resinous material within the mold form before it is expanded into a foam structure. Care should be taken to secure an adequate distribution of the unexpanded mass in normally hard to fill portions of the mold, as along its internal edges and in corners, recesses, pockets and along other irregular internal contours.

The exact optimum positioning and direction of the magnetic field or fields is an empirical matter which, as can be appreciated, may vary with the particular mass and conformation being formed into a foam molded structure and with the particular mold forms being employed. Likewise the strength, quantity and distribution of the magnetic field around the mold form depends on these and also upon other factors and considerations which are somewhat analogous to those which are applicable to the optimum quantity of magnetic material to be employed and which, by necessity, include the quantity, and the magnetic susceptibility of the magnetic material-containing expandable mass of thermoplastic resinous material.

Any thermoplastic resinous material which can be expanded or foamed by conventional techniques may advantageously be utilized in the practice of the present invention. In many instances and for a wide variety of applications it is particularly advantageous to employ expandable granules of alkenyl aromatic resinous materials or compounds which contain at least about 50 percent by weight of at least one alkenyl aromatic compound having the general formula Ar—CR=CH$_2$ wherein Ar is an aromatic radical and R is selected from the group consisting of a hydrogen atom and a methyl radical. Expandable, thermoplastic moldable polymers and copolymers of styrene, ar-methyl styrene or vinyltoluene, mono- and di-chlorostyrene and ar-dimethyl styrene may frequently be utilized with special benefit. The blowing agents employed for the expandable thermoplastic resinous materials may be those which are commonly utilized including dichlorodifluoromethane, carbon dioxide, pentane and the like as well as other suitable materials such as suitable gas generating agents. Conventional amounts of particular blowing agents may be utilized in the expandable materials.

The heat energy which is provided for foaming the expandable material while it is being magnetically positioned and distributed in the mold form may be the mentioned conventional heat sources such as steam, hot air, heated baths and the like which may be utilized in any desired manner or according to any suitable technique. If desired, the heat energy may be the result of high or radio frequency electric heating of the mass, as may be achieved by its dielectric heating.

The method of the present invention is further illustrated by the following examples:

*Example I*

A mass of expandable polystyrene granules having an average bead size of about 1/16″ and containing about 13 percent by weight of dichlorodifluoromethane as a blowing agent were thoroughly mixed with about a 10 percent by weight dispersion of powdered iron particles in an acrylic lacquer. The lacquer was comprised of about a 10 percent by weight solution of methyl methacrylate polymer in acetone containing a small amount of polyethyl acrylate as a plasticizer. A quantity of the dispersion sufficient to uniformly distribute about 2 percent by weight of the powdered iron firmly attached to the surface of the polystyrene granules was employed. About 15 grams of the iron-containing expandable polystyrene granules was charged to a 4" x 4" x 2" perforated magnesium mold fitted with 1" wide permanent magnets at its corners. The magnets were of the ordinary commercially available type of permanent magnets made from Alnico V. The iron-containing granules adhered to the interior surface of the mold in a substantially uniform layer over the magnets. The charged mold was immersed for about ½ minute in a heated bath of ethylene glycol at a temperature of about 145° C. which caused the granules to be expanded into an integral foam structure.

After the foaming, the mold was immersed for about one minute in water at a temperature of about 15° C. The molded foam structure which was obtained had sharp and square edges and was an excellently patterned duplication of the mold. It had extremely uniform cross-sectional characteristics and a uniform density throughout of about 2 pounds per cubic foot.

By way of comparison, when the foregoing procedure was repeated exactly with the exception that the magnets were not provided for or used with the mold, a molded foam structure was produced which had poorly defined edges and unfilled corners. In addition, its cross-sectional characteristics and uniformity were inferior to the molded foam structure which had been produced under the influence of magnetism.

*Example II*

A cylindrical, cup-shaped mold form is assembled by positioning a different sized pair of conventional stainless steel laboratory beakers in a spaced, nested arrangement, one within the other. The mold form is adapted to provide cup-like molded shapes having cylindrical side walls with an inner diameter of about five inches, an outer diameter of about six inches, an overall height of about six inches, an overall height of about seven and one-quarter inches and an inner container depth of about six and one-quarter inches. About 70 grams of expandable polystyrene granules containing about 0.06 percent by weight of divinylbenzene (for cross-linking purposes) and about 12 percent by weight of dichlorodifluoromethane as a blowing agent, and having an average bead size of about 1.4 millimeters, are charged to the bottom of the mold form. The granules are coated with an iron powder-containing lacquer of polymethylmethyacrylate dissolved in acetone so that about 5 percent by weight of finely divided iron particles and 5 percent by weight of the polymer is dispersed over the granules.

Three evenly spaced circumferential rings of 1¼ inch Alnico V permanent magnets are securely positioned around the outer cylindrical surface of the mold form. Each ring consists of eight of the magnets spaced uniformly about the circumference of the outer beaker. Two layers of magnets, with four similar Alnico V magnets in each, are inserted within the inner beaker against the inner wall of the mold form. When the mold form is shaken the magnets attract the magnetically susceptible granules into substantially uniform distribution along the inner surfaces of the mold form with greater concentrations in the areas nearest the poles of the magnets where a stronger magnetic field exists.

The mold form, containing the magnetically distributed charge, is immersed for about one and one-half minutes in a silicone oil bath heated to a temperature of about 140° C. in order to expand the granules, after which it is cooled for about two minutes in a water bath at about 10° C. The mold form is completely and uniformly filled with the expanded foam structure. The molding which is obtained has exceptionally uniform characteristics and is exactly in the pattern of the mold form.

When the procedure is duplicated excepting that no magnetic influence is employed, a poor and non-uniform molded foam structure is obtained. The height of the expanded foam structure produced without magnetic assistance is only about half the cylindrical height of the mold form. In addition, a severe density gradient is discernible in such a molded foam structure from the very dense and incompletely expanded part at the bottom of the molding to its extremely light upper portions. This is caused by the inability of the undistributed granules to expand uniformly during their foaming in order to uniformly and precisely fill the mold form.

As is apparent, the present invention permits superior foam molded articles to be manufactured with greater efficiencies in heating and material handling. It also permits foam moldings to be prepared in shorter heating periods or cycles for each molding and having greater relative thickness than is usually obtainable by conventional techniques. These and other benefits arise from the improved distribution of the expandable material which is positioned and distributed under magnetic influence in the mold form prior to its formation.

Since certain changes and modifications can readily be entered into in the practice of the present invention without departing substantially from its intended spirit and scope, it is to be fully understood that all of the foregoing description and specification be interpreted as being merely illustrative of the invention and should not be construed as being restricting or limiting thereof excepting as it is set forth and defined in the appended claims.

What is claimed is:

1. Compositions adapted to be molded into uniform foam structures consisting essentially of a thermoplastic resinous material in discrete, granular form in which there is incorporated a blowing agent and with which there is distributed in physically fixed relationship with said granules and in approximate uniformity a quantity of powdered iron in a finely divided solid form having an average particle size substantially smaller than said granular material.

2. The composition of claim 1 wherein powdered iron is distributed with the granular mass of expandable thermoplastic resinous material by being incorporated within the discrete granular forms therein.

3. The composition of claim 1 wherein powdered iron is distributed with the granular mass of expandable thermoplastic resinous material by being physically attached on the surfaces of the discrete granular forms therein.

4. A composition in accordance with the composition of claim 3 wherein the surface attachment of powdered iron is assisted by an inert adhesive means.

5. The composition of claim 1 wherein the thermoplastic resinous material is polystyrene.

6. The composition of claim 1 wherein the thermoplastic resinous material is polyvinyltoluene.

7. Method for expanding into a uniform molded foam structure an expandable granular thermoplastic resinous material containing a blowing agent incorporated in its discrete particles which comprises distributing a metallic magnetic material to be incorporated with the granules in approximate uniformity in and physically fixed with said granules in the mass of expandable thermoplastic resinous material, said magnetic material being in a finely divided solid form having an average particle size substantially smaller than the particular size of said granular resinous material; placing the magnetic material-containing mass of expandable thermoplastic resinous material within the confining space of a mold form; attracting the magnetic material-containing mass of expandable thermoplastic resinous material by means of at least one magnetic field which is positioned and directed in a manner tending to physically position and distribute the mass uniformly within the confining space of the mold form; and subjecting the magnetically attracted expandable mass while it is under the influence of the magnetic field to an adequate quantity of heat to soften the mass of thermoplastic resinous material and cause expansion of the blowing agent in the discrete particles in the mass to expand the mass to an integral, substantially uniform, molded foam structure.

References Cited in the file of this patent

UNITED STATES PATENTS

| | | |
|---|---|---|
| 2,467,214 | Luaces | Apr. 12, 1949 |
| 2,532,242 | Ott | Nov. 28, 1950 |
| 2,532,243 | Ott | Nov. 28, 1950 |
| 2,532,876 | Asche et al. | Dec. 5, 1950 |
| 2,714,747 | Lindemann et al. | Aug. 9, 1955 |
| 2,714,748 | Stirnemann et al. | Aug. 9, 1955 |
| 2,862,834 | Hiler | Dec. 2, 1958 |

OTHER REFERENCES

Hackh's "Chemical Dictionary," pages 337 and 616, 3rd Edition; copyright 1944, McGraw-Hill Book Company, New York.

Lange's "Handbook of Chemistry," page 1743, 9th Edition; copyright 1956, Handbook Pub. Inc., Sandusky, Ohio.

Partington, "Textbook of Inorganic Chemistry," page 930, 6th Edition; copyright 1950, Macmillan and Company, Ltd., London.

Latimer and Hildebrand: "Reference Book of Inorganic Chemistry," Revised Edition; copyright 1940, pages 392 and 933. Combined Volume, Macmillan Company, New York.

UNITED STATES PATENT OFFICE
CERTIFICATE OF CORRECTION

Patent No. 3,086,247 April 23, 1963

Louis C. Rubens

It is hereby certified that error appears in the above numbered patent requiring correction and that the said Letters Patent should read as corrected below.

Column 5, lines 39 and 40, strike out "an overall height of about 6 inches"; column 8, line 13, for "933" read -- 393 --.

Signed and sealed this 14th day of January 1964.

(SEAL)
Attest:

ERNEST W. SWIDER

Attesting Officer

EDWIN L. REYNOLDS

Acting Commissioner of Patents